Nov. 21, 1950         G. D. RITCHIE         2,531,295
VEHICLE REGISTRATION CARD AND SERVICE TALLY HOLDER
Filed Jan. 22, 1947
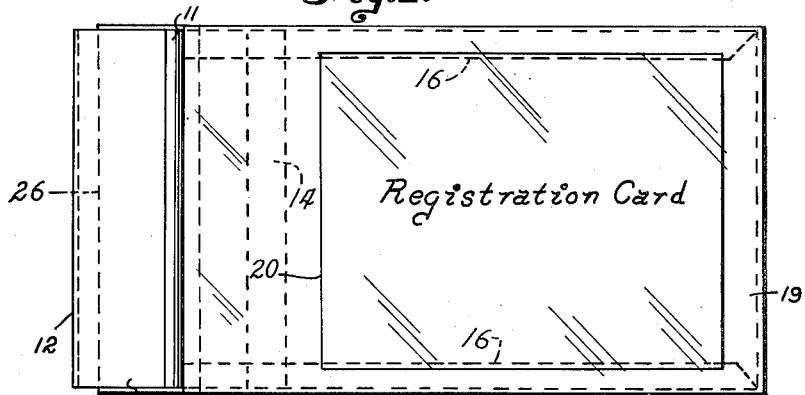
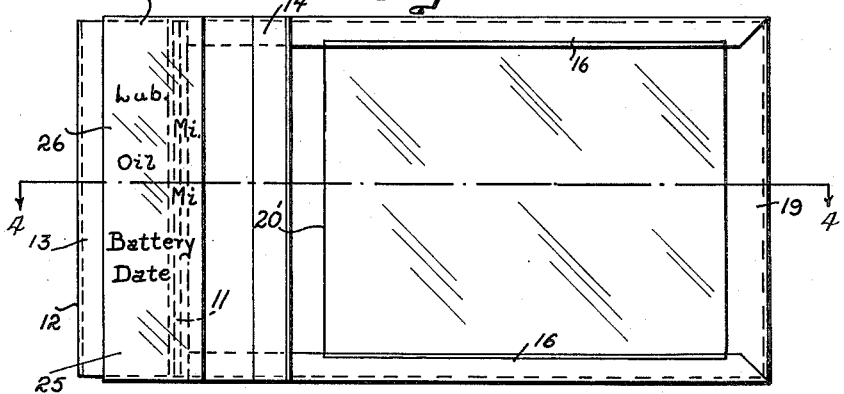
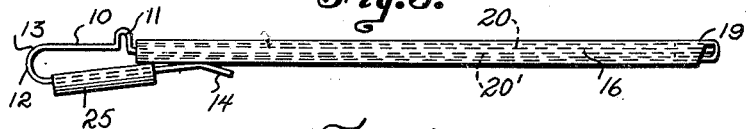
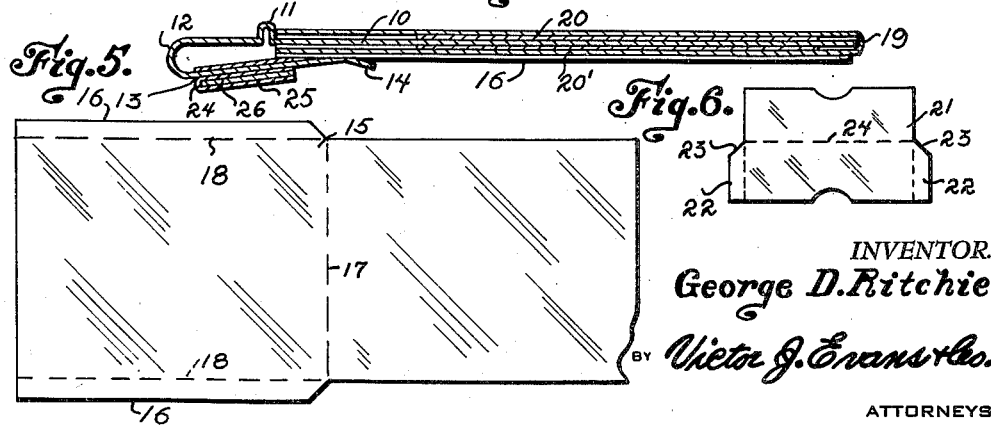
INVENTOR.
George D. Ritchie
BY Victor J. Evans & Co.
ATTORNEYS Patented Nov. 21, 1950

2,531,295

UNITED STATES PATENT OFFICE 2,531,295

VEHICLE REGISTRATION CARD AND SERVICE TALLY HOLDER

George D. Ritchie, Evansville, Ind.

Application January 22, 1947, Serial No. 723,605

1 Claim. (Cl. 40—11)

This invention relates to a card holder for attaching to and holding in position on the sun visor of the vehicle, any vehicle registration card or other identification papers, so that the owner of the vehicle may quickly present to the proper authorities, proof of ownership, by merely swinging the sun visor downwardly to a reading position, thus eliminating the necessity of the removal of the holder from its place of attachment in the vehicle. The general objects of the invention are to provide a holder for a registration card or identification papers that will eliminate the requirement of pulling a billfold out of a garment pocket, where most cards or papers are carried, to display the same upon request for examination of the papers by the proper authority; will retain the card or papers in the vehicle at all times as required by law; will eliminate the unstrapping of a holder from the steering column of the vehicle for the reading thereof; is easy to apply and once applied, removal thereof for inspection purposes is eliminated, is strong, durable, having no parts to lose or replace, and requires no screws, straps or bolts to retain it in place, and once positioned on the sun visor, will remain until a new card has to be replaced therein, and in addition, will display the condition of the car as to the lubrication thereof, and care of the battery.

With the above and other objects and advantages in view, the invention consists of the novel details of construction, arrangement and combination of parts more fully hereinafter described, claimed and illustrated in the accompanying drawing in which:

Figure 1 is a front elevational view of an embodiment of the invention;

Figure 2 is a rear elevational view thereof;

Figure 3 is a side elevational view thereof;

Figure 4 is a longitudinal sectional view on the line 4—4 of Figure 2;

Figure 5 is an elevational view of the blank from which the transparent pocket for the device is formed and Figure 6 is an elevational view of the blank from which the transparent pocket for the car status is formed.

Referring more in detail to the drawing, the numeral 10 designates the card holder which is formed from a sheet of aluminum or any other suitable metal or material.

The holder 10 is provided inwardly of one end thereof with a transverse upstanding rib 11 which acts as a stop for registration cards or papers and as a means for obtaining a better grip on the holder when applying or removing the holder on the sun visor of a vehicle. Outwardly of the rib 11, the holder 10 is rolled over at 12 upon itself to provide a spring clip 13, and the edge 14 of the clip is extended outwardly at an angle from the holder to facilitate the insertion of the clip over the sun visor of the vehicle. The remainder of the holder on the opposite side of the rib 11 forming a substantially plane major body portion. The body portion providing a support for card, tallies and et cetera. The spring clip 13 having a U-shaped bight portion having a shorter body portion outwardly thereof for like purposes.

In Figure 5, there is shown a blank 15 of transparent material having side flanges 16 thereof which extend along the longitudinal side edges thereon for approximately half the distance. The blank is bent upon itself along the central line 17, and the side flanges are bent inwardly on the bent portions along the lines 18 to form a transparent pocket 19, which is adapted to be inserted over the holder 10, and pushed forward thereon until the forward edge of the pocket 19 abuts the rib 11.

In use, cards or the like 20 and 20', are placed in the pocket 19 on opposite sides of the holder 10, and due to the transparent nature of the pocket 19, the cards can be easily read as desired.

In Figure 6, there is shown a blank 21 of transparent material, having end flanges 22 which are formed with a bevelled edge 23 at the medial line 24 of the blank, where the blank is bent upon itself to form the pocket, the end flanges 22 being bent over the blank to form a pocket 25 for a lubrication and battery status card 26. The pocket 25 is adapted to be positioned on the clip 13 and be retained thereon by means of the flanges 22 engaging the side edges of the clip.

As stated, the holder is placed on the sun visor of a motor vehicle, and by swinging the visor to a readable position, all of the cards carried thereby can be easily inspected, card 20 may be visible then by removing the holder from the visor and the rib 11 on the holder will prevent the cards from slipping out of the transparent pocket, once placed therein.

It is believed that from the foregoing description, the construction and operation of the invention will be apparent to those skilled in the art, and it is to be understood that changes in the minor details of construction, arrangement and combination of parts may be resorted to, provided they fall within the spirit of the invention, and the scope of the appended claim.

Having thus described the invention, what is claimed as new and desired to be secured by Letters Patent is:

A device for retaining motor car registration cards and oil service tallies comprising a member of sheet material having a substantially plane major body portion providing a support for indicia adapted to be disposed on opposite sides thereof, a relatively shorter body portion spaced from one end portion of the major body portion and providing a support for indicia on one side thereof, a U-shaped bight portion resiliently connecting said body portions to render said member adaptable for removable attachment to a sun visor or like support, and removable transparent pocket members embracing said body portions for retaining cards and the like in association with said body portions, said member being provided with a card and pocket member stop means intermediate said major body portion and said U-shaped bight portion.

GEORGE D. RITCHIE.

REFERENCES CITED

The following references are of record in the file of this patent:

UNITED STATES PATENTS

| Number | Name | Date |
| --- | --- | --- |
| 506,802 | Stowe | Oct. 17, 1893 |
| 1,034,403 | Weitzel | July 30, 1912 |
| 1,128,044 | Rand et al. | Feb. 9, 1912 |
| 1,730,007 | Hemenway | Oct. 1, 1929 |
| 1,782,942 | Souter | Nov. 25, 1930 |
| 2,181,077 | Magovern | Dec. 5, 1939 |
| 2,241,882 | Hecht | May 13, 1941 |
| 2,333,302 | Enk | Nov. 2, 1943 |

FOREIGN PATENTS

| Number | Country | Date |
| --- | --- | --- |
| 492,016 | Great Britain | Sept. 13, 1938 |